US009203505B2

(12) United States Patent
Roy et al.

(10) Patent No.: US 9,203,505 B2
(45) Date of Patent: Dec. 1, 2015

(54) VIRTUAL DATA FRAMING FOR DATA PACKET TRANSMISSION OVER CHANNELS OF A COMMUNICATIONS NETWORK

(71) Applicant: Hughes Network Systems, LLC, Germantown, MD (US)

(72) Inventors: Satyajit Roy, Gaithersburg, MD (US); Guy Montgomery, Potomac, MD (US); Jeffrey Biber, Sterling, VA (US); Dan Hooper, Ellicott City, MD (US); Roderick Ragland, Silver Spring, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 88 days.

(21) Appl. No.: 13/907,794

(22) Filed: May 31, 2013

(65) Prior Publication Data
US 2014/0355594 A1 Dec. 4, 2014

(51) Int. Cl.
*H04B 7/212* (2006.01)
*H04J 3/16* (2006.01)
*H04J 3/06* (2006.01)
*H04L 29/06* (2006.01)

(52) U.S. Cl.
CPC . *H04B 7/212* (2013.01); *H04J 3/06* (2013.01); *H04J 3/062* (2013.01); *H04J 3/0632* (2013.01); *H04J 3/1694* (2013.01); *H04L 29/06176* (2013.01)

(58) Field of Classification Search
CPC ............ H04J 3/1694; H04J 3/062; H04J 3/06
USPC ......................................................... 370/348
See application file for complete search history.

(56) References Cited

U.S. PATENT DOCUMENTS

2008/0151926 A1* 6/2008 Mosko et al. ................. 370/447

* cited by examiner

*Primary Examiner* — Sai-Ming Chan
(74) *Attorney, Agent, or Firm* — Potomac Technology Law, LLC

(57) ABSTRACT

An approach for transmission of data packets, based on virtual frame timing, over a communications channel is provided. A remote terminal receives a first stream of data packets at periodic time intervals. The terminal receives an allocation of time slots within a sequence of TDMA transmission frames, for transmission of the data packets over the channel. The timing structure of the allocated time slots is based on a virtual frame size relative to the interval timing of the first data packet stream, and independent of the frame size/timing of the TDMA transmission frames. The remote terminal may receive a second stream of data packets at periodic time intervals that differ from the time intervals of the first stream. In a multi-stream scenario, the virtual frame size for the time slot allocation is based on the greatest common denominator of the interval timings of the first and second data streams.

20 Claims, 8 Drawing Sheets

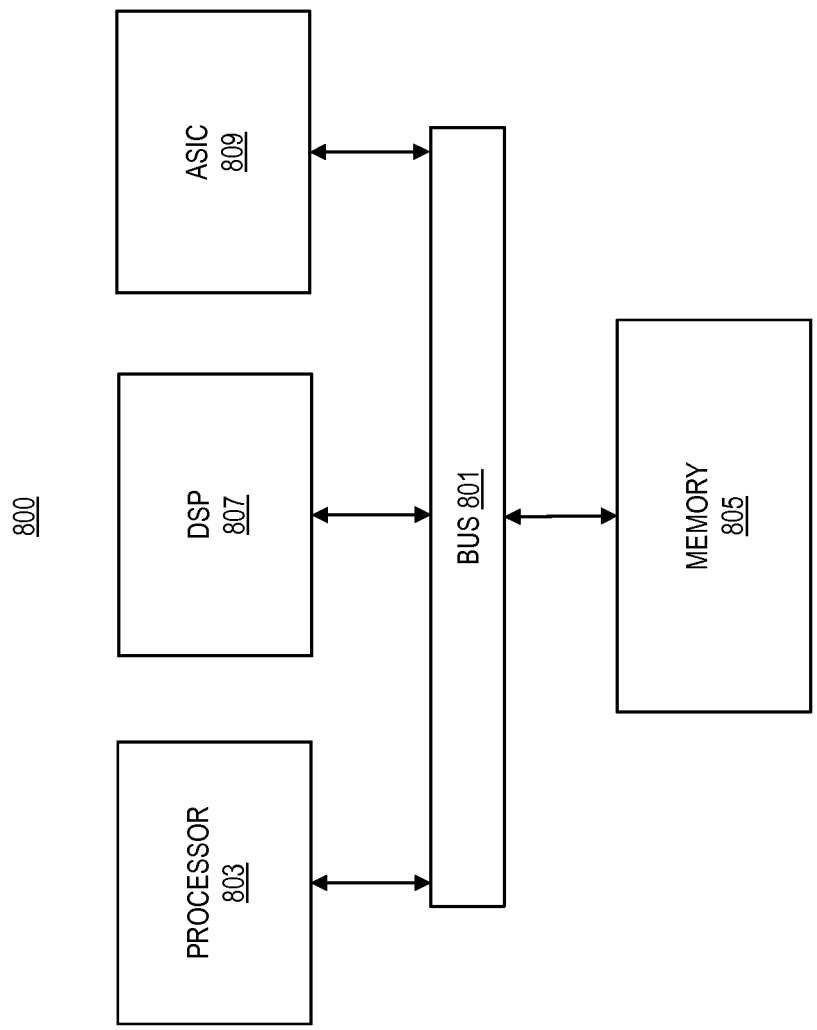

VIRTUAL DATA FRAMING FOR DATA PACKET TRANSMISSION OVER CHANNELS OF A COMMUNICATIONS NETWORK

BACKGROUND

The present invention generally relates to the reduction or removal of packet jitter and latency in Time Division Multiple Access (TDMA) telecommunication systems including Multi-Frequency TDMA (MF-TDMA) systems.

Time Division Multiple Access (TDMA) is a channel access method for shared medium telecommunication networks. It allows several user terminals to share the same frequency channel by dividing the signal into different time slots. The user terminals transmit in rapid succession, one after the other, each using its own time slot. This allows multiple stations to share the same transmission medium (e.g., radio frequency channel) while using only a part of its channel capacity. TDMA is used in the digital 2G cellular systems such as Global System for Mobile Communications (GSM), IS-236, Personal Digital Cellular (PDC) and iDEN, and in the Digital Enhanced Cordless Telecommunications (DECT) standard for portable phones. It is also used extensively in satellite systems as well as combat-net radio systems and PON networks for upstream traffic from premises to the operator. For satellite networks, MF-TDMA is the dominant technology because it provides the most bandwidth and the greatest overall efficiency and service quality, while also allowing the dynamic sharing of that bandwidth among many (tens of thousands) of transmitters in a two-way communication mode.

Unlike a Single Carrier Per Channel (SCPC) system, a system employing TDMA is more prone to producing packet jitter. In an SCPC system user packets can be transmitted as soon as they arrive for transmission whereas in a TDMA system there could be a variable temporal gap between when packets arrive and when time slots are allocated for the terminal to send those packets. The variable gaps produced manifest themselves as packet jitter. In addition to packet jitter, the queuing of packets for delayed transmission in allocated slots and the queuing of packets in buffers used in conventional methods of reducing jitter can add significantly to packet latency across the TDMA link. It is important to maintain good service quality in a telecommunications network, and control and reduction of jitter and latency is a significant part of that. Jitter and latency measurements are often used in Mean Opinion Score (MOS) algorithms as a means to provide metrics for voice quality in voice applications.

Conventional jitter buffers remove packet jitter by outputting packets based on the original packet timing, for example, as delivered from an upper layer (e.g., the application layer). For example, a conventional jitter buffer, at a receiver end of a communications channel, will receive packets at some packet interval. The packet interval may not be regular and may not match the original interval as received at the transmitter end. The difference in timing between the packet interval with respect to the delivery of packets to a transmitter at the transmission end of a communications channel and the packet interval with respect to the receipt of those packets as transmitted over the communications channel may be caused by several factors, such as allocated slot assignments within a TDMA frame and transmission delays over the communications channel. The jitter buffer at the receiver generally releases the received packets at a regular packet interval. The jitter buffer must therefore retain each packet for a period of time to achieve that regular interval, and must queue enough packets to ensure a packet will always be available for output. In a conventional TDMA system, both the wait time for transmit opportunities, and the buffer retention time necessary for jitter removal by a conventional jitter buffer, add up to the introduction of a considerable amount of packet latency into the link. Further, the packet latency is exacerbated in communications systems that exhibit relatively long transmission times (e.g., satellite communications systems where the round trip satellite delay can reflect a major contributor to latency). As a result, such added packet latency adversely affects the service quality experienced by quality of service (QoS) sensitive applications (e.g., voice applications, such as Voice over Internet Protocol (VOIP)).

What is needed, therefore, is an approach for mitigating packet jitter and latency, ensuring high quality QoS, for jitter and latency sensitive applications over TDMA (including MF-TDMA) systems.

SOME EXAMPLE EMBODIMENTS

The present invention advantageously addresses the foregoing requirements and needs, as well as others, by providing systems and methods for mitigating packet jitter and latency, ensuring high quality QoS, for jitter and latency sensitive applications over TDMA (including MF-TDMA) systems.

In accordance with example embodiments of the invention, a method comprises receiving, by a remote terminal device, a first source data stream for transmission over a transmission channel of a communications network, wherein the first source data stream comprises a series of data packets received by the remote terminal device at periodic time intervals. The terminal also receives an allocation of bandwidth for the data packets of the first source data stream, wherein the bandwidth allocation comprises a plurality of time slots of a sequence of time division multiple access (TDMA) transmission frames, wherein a timing structure of the allocated time slots is based on a virtual frame size relative to the periodic interval timing of the data packets of the first source data stream, and wherein the virtual frame size is independent of a timing structure or frame size of the TDMA transmission frames. Each data packet of the first source data stream is assigned to a respective allocated time slot for transmission over the transmission channel. By way of example, the data packets of the first source data stream may be received by the remote terminal device at a constant rate, and the virtual frame size may be configured to correspond with the periodic time intervals at which the data packets of the first source data stream are received by the remote terminal device. By way of further example, the virtual frame size may be configured based on one or more of the following: a quality of service requirement associated with the first source data stream; a voice codec rate associated with the first source data stream; and a packet timing interval determined during an initial training period of the receipt of the data packets of the first source data stream.

According to a further example embodiment, the remote terminal device also receives a second source data stream for transmission over the transmission channel of the communications network, wherein the second source data stream comprises a series of data packets received by the remote terminal device at periodic time intervals, wherein the periodic time intervals of the data packets of the second source data stream differ from the periodic time intervals of the data packets of the first source data stream. By way of example, the timing structure of the allocated time slots may be based on a virtual frame size relative to a greatest common denominator of the periodic interval timing of the data packets of the first source data stream and the periodic interval timing of the data packets of the second source data stream, and the data packets of the first source data stream and the second source data stream is each assigned to a respective allocated time slot for transmission over the transmission channel. By way of further example, the data packets of the first source data stream are received by the remote terminal device at a first constant rate and the data packets of the second source data stream are received by the remote terminal device at a second constant rate that differs from the first constant rate, and the virtual frame size is configured to correspond with the greatest common denominator, and wherein the greatest common denominator is with respect to the first constant rate and the second constant rate.

In accordance with additional example embodiments of the invention, an apparatus comprises a first port configured to receive a first source data stream for transmission over a transmission channel of a communications network, wherein the first source data stream comprises a series of data packets received by the apparatus at periodic time intervals. The apparatus further comprises a processor configured to receive an allocation of bandwidth for the data packets of the first source data stream, wherein the bandwidth allocation comprises a plurality of time slots of a sequence of time division multiple access (TDMA) transmission frames, wherein a timing structure of the allocated time slots is based on a virtual frame size relative to the periodic interval timing of the data packets of the first source data stream, and wherein the virtual frame size is independent of a timing structure or frame size of the TDMA transmission frames. The processor is further configured to assign each data packet of the first source data stream to a respective allocated time slot for transmission over the transmission channel. By way of example, the data packets of the first source data stream may be received by the apparatus at a constant rate, and the virtual frame size may be configured to correspond with the periodic time intervals at which the data packets of the first source data stream are received by the apparatus. By way of further example, the virtual frame size may be configured based on one or more of the following: a quality of service requirement associated with the first source data stream; a voice codec rate associated with the first source data stream; and a packet timing interval determined during an initial training period of the receipt of the data packets of the first source data stream.

According to a further example embodiment, the apparatus further comprises a second port configured to receive a second source data stream for transmission over the transmission channel of the communications network, wherein the second source data stream comprises a series of data packets received by the apparatus at periodic time intervals, wherein the periodic time intervals of the data packets of the second source data stream differ from the periodic time intervals of the data packets of the first source data stream. Further, the timing structure of the allocated time slots is based on a virtual frame size relative to a greatest common denominator of the periodic interval timing of the data packets of the first source data stream and the periodic interval timing of the data packets of the second source data stream, and the data packets of the first source data stream and the second source data stream is each assigned to a respective allocated time slot for transmission over the transmission channel. By way of example, the data packets of the first source data stream may be received by the apparatus at a first constant rate and the data packets of the second source data stream may be received by the apparatus at a second constant rate that differs from the first constant rate, and the virtual frame size may be configured to correspond with the greatest common denominator, and wherein the greatest common denominator is with respect to the first constant rate and the second constant rate.

Still other aspects, features, and advantages of the present invention are readily apparent from the following detailed description, which illustrates and describes a number of particular example embodiments and implementations, including the best mode contemplated for carrying out the present invention. The present invention is also capable of further embodiments, and its several details can be modified in various obvious respects, all without departing from the spirit and scope of the present invention. Accordingly, the drawing and description are to be regarded as illustrative in nature, and not as restrictive.

BRIEF SUMMARY OF THE DRAWINGS

The present invention is illustrated by way of example, and not by way of limitation, in the figures of the accompanying drawings, in which:

FIG. 8 illustrates a block diagram of a chip set that can be utilized in implementing VFF approaches, in accordance with example embodiments of the present invention.

DETAILED DESCRIPTION

Figure 1:
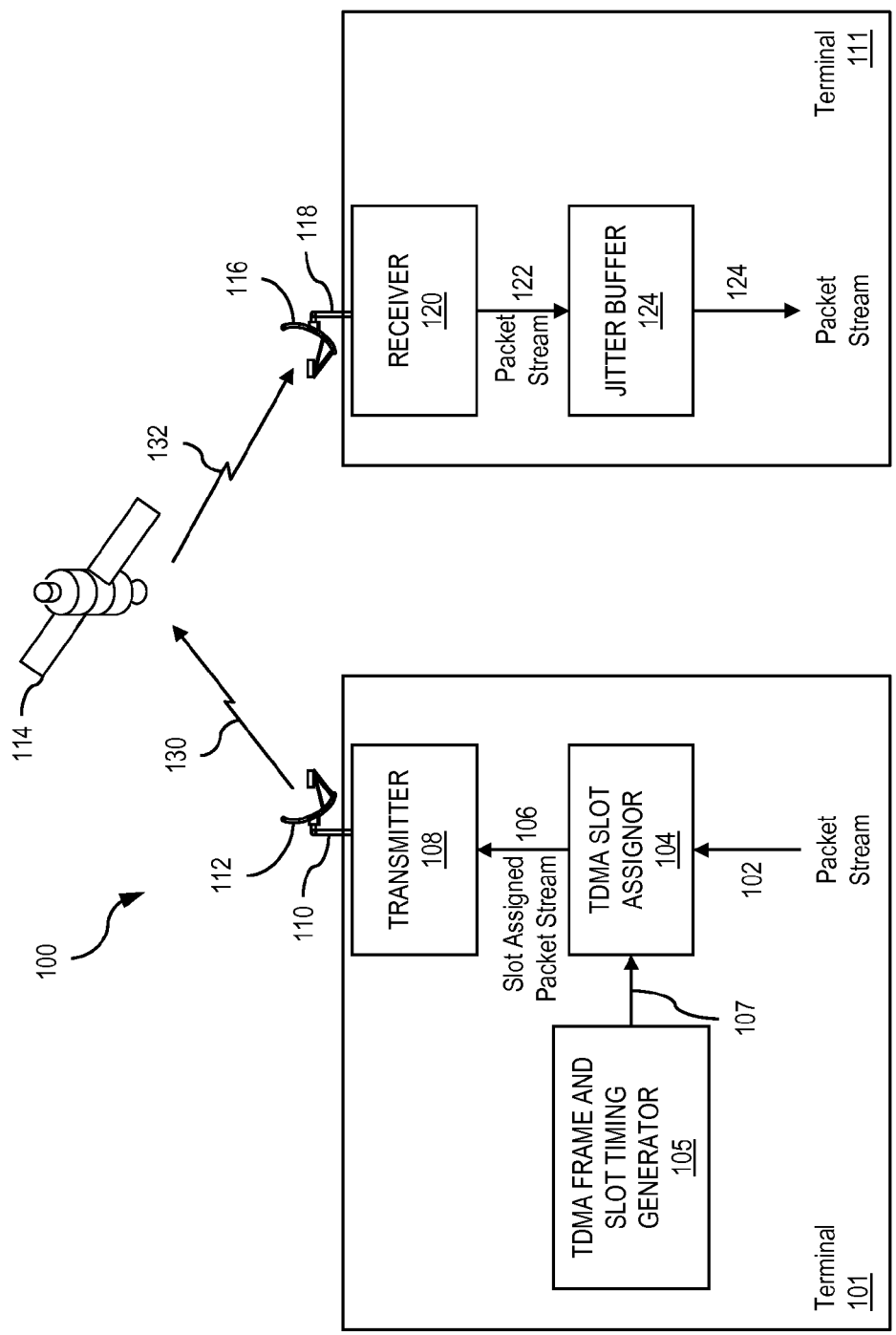
FIG. 1 illustrates an end-to-end transmission signal path in a TDMA satellite system capable of employing approaches for mitigating or eliminating jitter, in accordance with example embodiments of the present invention.

Systems and methods for mitigating packet jitter and latency, ensuring high quality QoS, for jitter and latency sensitive applications over TDMA (including MF-TDMA) systems, are herein described.

Systems and methods in accordance with example embodiments of the present invention significantly reduce the packet jitter in a TDMA system caused by the transmission of data packets in assigned TDMA time slots of fixed length physical TDMA frames, where the interval timing of the assigned time slots is inconsistent with the rate at which the data packets are received by the transmitting terminal According to example embodiments, time slots for the transmission of such data are assigned based on a virtual frame timing, which are relatively consistent with the rate at which data packets are received, but are independent of the fixed physical TDMA frame timing. By no longer being tied to the physical TDMA framing structure, such virtual frame timing provides a great deal of flexibility on a per terminal and per input data stream basis. Such novel timing sets are referred to herein as Virtual Flexible Framing (VFF), the processes of which being referred to as VFF processes and the frames of which being referred to as virtual frames. The conventional TDMA timing still provides a common fixed system synchronization frame to all user terminals in the TDMA or MF-TDMA network, including timing for the basic TDMA slot boundaries and overhead channels. However, uniquely with VFF, one or more virtual frames are generated so that the slots can be now be allocated to data traffic not only on the basis of the timing of the incoming data packet streams, but tailored to those streams. Such allocations are thus released from the constraints of the fixed TDMA frame and its conventional one shot per frame multi-slot transmission opportunity which is the primary cause of TDMA jitter and subsequent packet latency.

By way of example, for a packet stream of packets spaced 20 ms apart, a conventional single frequency TDMA system with a 45 ms frame period would provide only one transmission opportunity per frame, that is, packets would be transmitted in groups of consecutive slots that are 45 ms part. For an embodiment using the unique aspects of the present invention, however, the TDMA frame would be supplemented with a virtual frame generated and tailored to the incoming packet stream and which would have a 20 ms frame period. The 20 ms virtual frame would then be used for the slot assignment process instead of the 45 ms physical layer TDMA frame and the VFF process would ensure opportunities for transmission with fewer consecutive slots allocated per burst and at a spacing matching the spacing of the packet stream. In addition, the VFF process would choose slots on the basis of minimizing the wait time for any packet to be transmitted. The use of VFF, therefore, virtually eliminates the cause of TDMA slot assignment jitter and also reduces the packet latency significantly as compared with the methods of a conventional TDMA system using a conventional jitter buffer.

FIG. 1 illustrates an end-to-end transmission signal path in a TDMA satellite system capable of employing approaches for mitigating or eliminating jitter, in accordance with example embodiments of the present invention. With reference to FIG. 1, system 100 includes a TDMA slot assigner 104, a TDMA frame and slot timing generator 105, a transmitter 108, a transmission antenna 112, a satellite 114, a receiving antenna 116, a receiver 120 and a jitter buffer 124. The transmitter 108 and the TDMA slot assigner 104 represent components of a satellite terminal 101 at the transmission end of the system 100. The receiver 120 and the jitter buffer 124 represent components of a satellite terminal 111 at the receiving end of the system 100. TDMA slot assigner 104 is arranged to receive packet stream 102 and to output slot-assigned packet stream 106. TDMA frame and slot timing generator 105 provides TDMA frame and slot timing to TDMA slot assigner 104 via TDMA timing signals 107. Transmitter 108 is arranged to receive slot-assigned packet stream 106 and output RF signal 110 to transmission antenna 112. Transmission antenna 112 is arranged to transmit RF signal 110 over the communications link or channel 130 to satellite 114. Receiving antenna 116 is arranged to receive downlink 132 over-the-air from satellite 114 and output RF signal 118. Receiver 120 is arranged to receive RF signal 118 and output packet stream 122 to jitter buffer 124, and jitter buffer 124 is arranged to output packet stream 126.

Packet stream 102 is the input data to system 100 and is the data to be transmitted over the satellite in order for it to be received at the far end of the telecommunications link. In this example, packet stream 120 is a serial stream of packets with the packets starting at regular intervals. Packet stream 102 is not synchronized with the TDMA frame timing when it enters system 100. TDMA slot assigner 104 assigns packets of packet stream 102 to TDMA time slots in the TDMA frame and inserts packets of packet stream 102 in assigned TDMA time slots to produce slot-assigned packet stream 106. In other examples, TDMA slot assigner 104 may be simultaneously assigning and inserting other user data and overhead information to TDMA time slots for satellite transmission. Transmitter 108 provides modulation and forward error correction (FEC) encoding for slot-assigned packet stream 106 and conversion to radio frequencies to produce RF signal 110. RF signal 110 is transmitted over-the-air by transmission antenna 112. Slot-assigned packet stream 106 contains the data packets of packet stream 102 resynchronized to the TDMA frame for transmission. In other examples, slot-assigned packet stream 106 may also include other user data and overhead data in addition to the data packets originating from packet stream 102.

RF signal 110 is a radio frequency signal which is the result of transmitter 108 taking slot-assigned packet stream 106 and applying modulation, FEC encoding and frequency upconversion. Satellite 114 receives the radio frequency signal from transmit antenna 112 and converts it to a different radio frequency for re-transmission down to the earth. Receiving antenna 116 converts over-the-air signals received from satellite 114 to an RF signal compatible with receiver 120. Receiver 120 converts RF signal 118 to a data packet stream by applying downconversion, demodulation and decoding. Jitter buffer 124 removes jitter from the data packet stream. RF signal 118 is the RF signal 110 after being transmitted over satellite 114 and received through receiving antenna 116. Packet stream 122 contains the same packet data as slot-assigned packet stream 106. Packet stream 122 has the same timing as slot-assigned packet stream 106 with packets appearing in assigned TDMA time slots.

The timing of the packets of packet stream 122 being according to assigned TDMA time slots means that the spacing in time of packets will be different from the regular spacing of packet stream 102. The difference in packet spacing is known by the term packet jitter. Packet jitter is removed by jitter buffer 124 by removing the difference in packet spacing. This is done by inputting packets of packet stream 122 into jitter buffer 124 as they arrive with TDMA time slot timing, then outputting packets of packet stream 122 from jitter buffer 124 using the same regular packet spacing as packet stream 102, to produce packet stream 126.

According to the illustrated embodiments, transmitter 108 and transmission antenna 112 are shown to be a satellite link transmitter and a satellite dish respectively, but in other examples may be any components used to transmit a packet stream to a receiving station, non-limiting examples of which include a cellular transmitter and antenna, a WiFi or Bluetooth transmitter and antenna, a terrestrial microwave link transmitter and antenna or a device for wired telecommunications transmission. Similarly, in this example, receiving antenna 116 and receiver 120 are shown to be a satellite dish and a satellite link receiver respectively, but in other example may be any components used to receive a packet stream from a transmitting station, non-limiting examples of which include a cellular receiver and antenna, a WiFi or Bluetooth receiver and antenna, a terrestrial microwave link receiver and antenna or a device for wired telecommunications reception.

Figure 2:
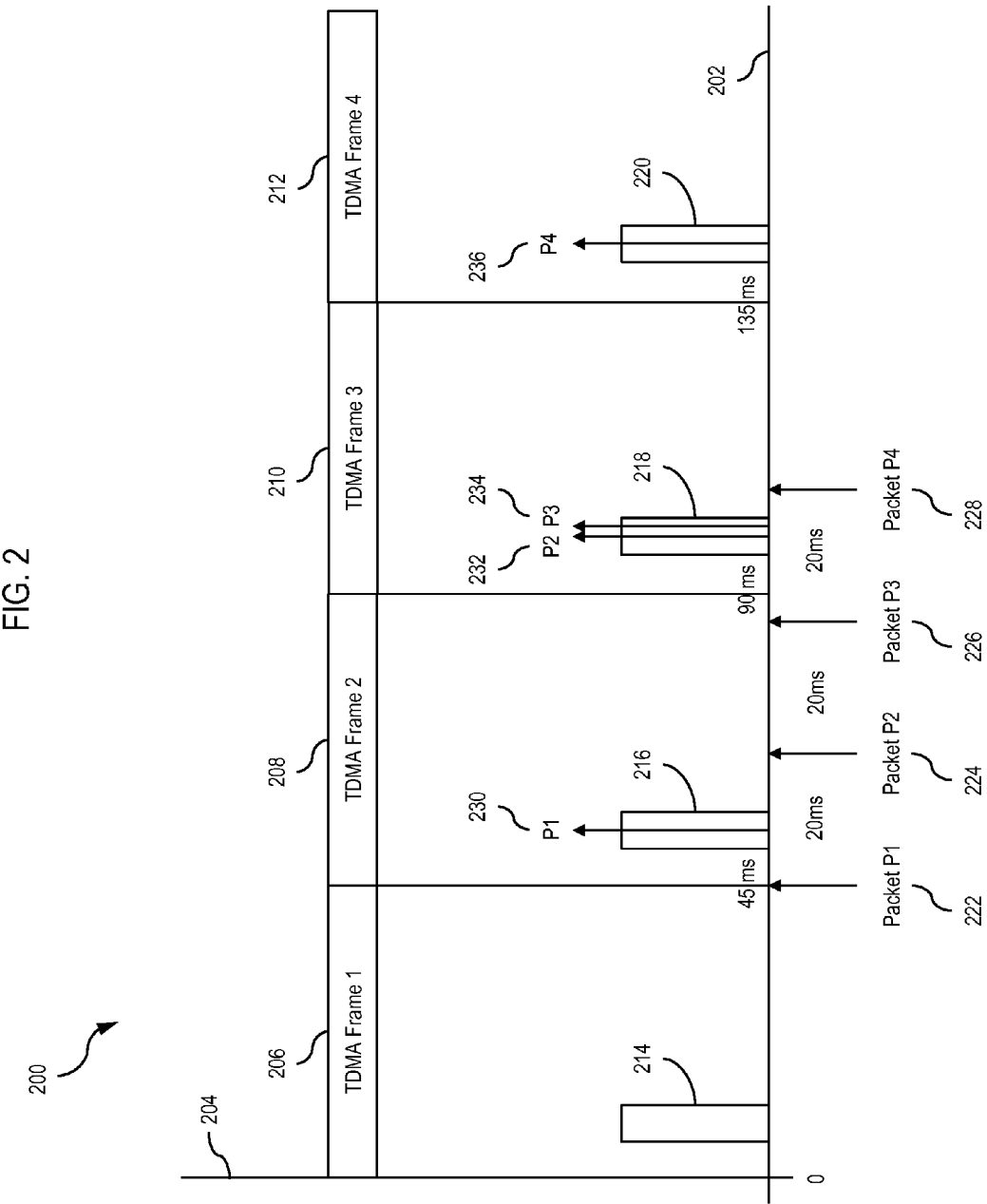
FIG. 2 illustrates a transmission timing diagram for transmission of a constant rate data packet stream, wherein the data packets arrive at the transmission section of a terminal at regular time intervals.

FIG. 2 illustrates a transmission timing diagram 200 for transmission of a constant rate data packet stream, wherein the data packets arrive at the transmission section of a terminal at regular time intervals (e.g., a VoIP data packet stream). With reference to FIG. 2, timing diagram 200 includes an X-axis 202 and a Y axis 204. The timing diagram further depicts TDMA frames 206, 208, 210 and 212, assigned TDMA slots of data bursts 214, 216, 218 and 220, input packets 222, 224, 226 and 228, and output packets 230, 232, 234 and 236. The X-axis 202 represents time and y-axis 204 represents timing events. In this example, TDMA frames 206, 208, 210 and 212 are arranged to be 45 ms in length. The assigned TDMA slots within data bursts 214, 216, 218 and 220 are assigned as being arranged to occur shortly after the start of each TDMA frame, and each data burst may include more than one assigned TDMA slot—but again, where multiple slots per TDMA frame are assigned to a terminal, those slots are assigned as consecutive slots within the respective burst.

Figure 3:
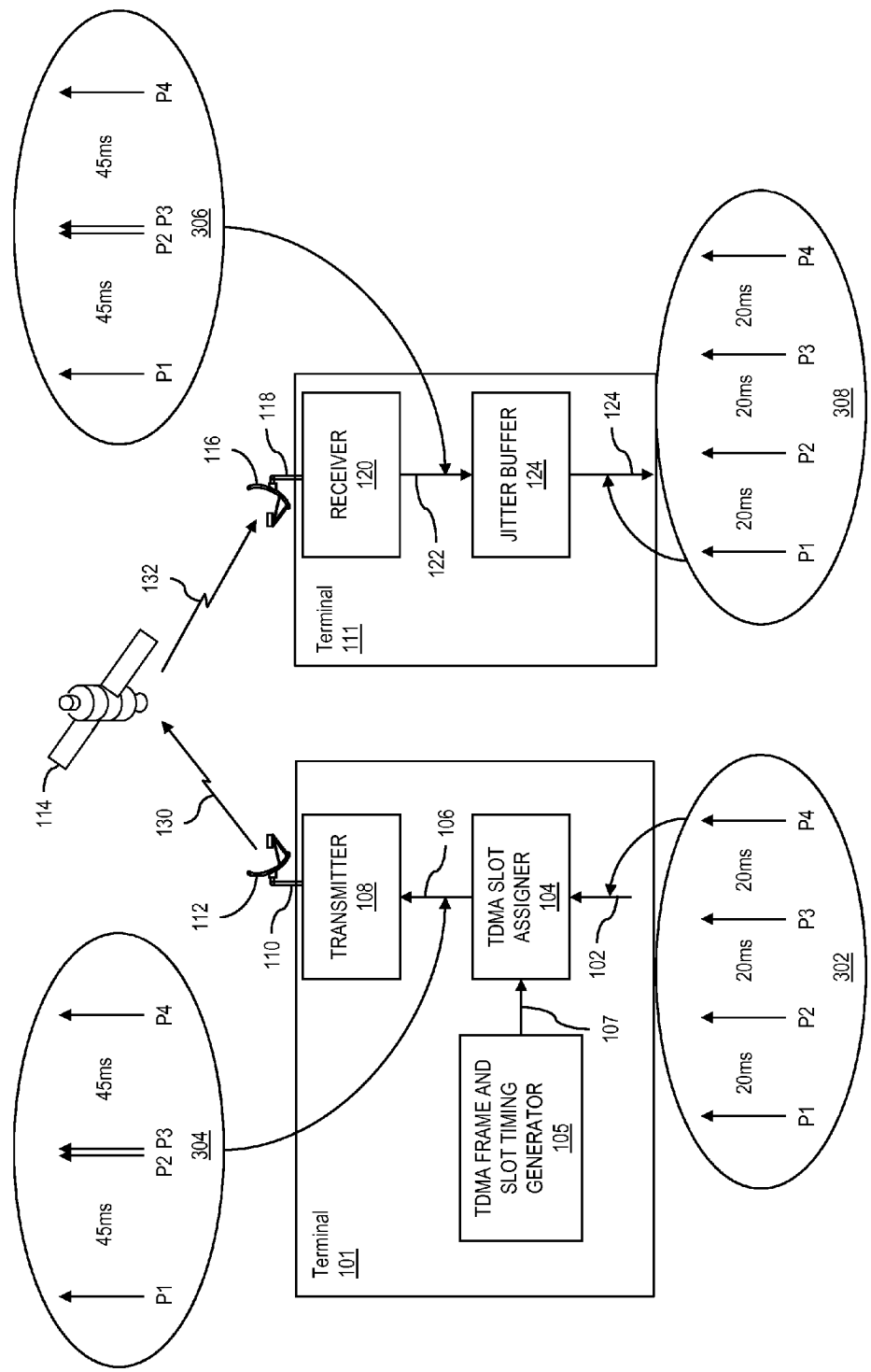
FIG. 3 illustrates a block diagram depicting an end-to-end transmission signal path for the data packet stream of FIG. 2 over the system of FIG. 1.

FIG. 3 illustrates a block diagram depicting an end-to-end transmission signal path for the data packet stream of FIG. 2 over the system of FIG. 1. First the packets P1, P2, P3, P4 (222, 224, 226, 228) are received at the 20 ms intervals (as reflected by 302). The packets are inserted in the transmission slots 216, 218, 220 by the TDMA slot assignor to generate the signal 106 (as reflected by 304), and transmitted over the satellite to the receiver 120 via the communications channels 130 and 132. The receiver 120 demodulates and decodes the received RF signal 118, to generate the received burst signals reflected by 306. At this point, without the jitter buffer 124, the original packet stream of regularly arriving packets will appear at the point of the communications path at signal 122, as reflected by the irregular packet interval timing 306, and thus exhibiting considerable jitter. In order to ensure quality of service for the application using the link, the jitter must be removed or reduced. Accordingly, the jitter buffer is added to the receiver end of the link to mitigate or remove the jitter effect. The jitter buffer delays release of the packets P1, P2, P3, P4, to realign the packets into the original 20 ms packet interval timing (as reflected by 308).

In a TDMA link, the transmit channel is divided into time periods called frames. The conventional TDMA system described here has a frame period of 45 milliseconds (ms). The frame timing is broadcast throughout the network so that all terminals in the network can synchronize to it. The frames are further divided in into time periods called slots. In a MF-TDMA system, there are multiple channels at different frequencies all synchronized to the frame timing, each channel being divided into slots. The channels and their slots form a pool of opportunities for TDMA terminals to transmit a short burst of data. Conventionally, in a TDMA system, a central processor (e.g., a bandwidth manager) at a Network Operations Center (NOC) assigns specific TDMA channels and slots for transmission of the terminal data (e.g., from an end-user application, such as voice data from a VoIP session). The channel and slot assignments are generally referred to as a Network Plan. The Network Plan ensures that all terminals in the network are assigned channels and slots such that they do not transmit data bursts on the same channel frequency at the same time thus avoiding the terminals' RF signals interfering with other. In a conventional system, the Network Plan gives only a single opportunity per frame for a TDMA terminal to transmit data. That transmit opportunity consists of one or more consecutive slots within each physical layer TDMA data frame. The number of channels and consecutive slots allocated to TDMA terminal is based on the bandwidth required for its traffic. The Network Plan can be static or it can change dynamically according to changing bandwidth requirements over time.

With reference again to FIG. 2, the slots in each TDMA frame 206, 208, 210 and 212 have been assigned to transmit data slots 214, 216, 218, 220. Transmit data slots 214, 216, 218, 220 form part of the pool of opportunities for packets to be transmitted, and each burst can consist of several consecutive slots. Four input packets 222, 224, 226 and 228 are assigned to be transmitted at the earliest opportunity which is in their next available burst, so input packet 222 is assigned to slot(s) within data burst 216, input packets 222 and 224 are both assigned to slot(s) within data burst 218 and input packet 226 is assigned to slot(s) within data burst 220. Thus, timing diagram 200 of FIG. 2 illustrates that input data packets arriving at regular 20 ms intervals are subsequently transmitted at irregular intervals. Input packets 222, 224, 226 and 228 arriving at intervals 20 ms, 20 ms and 20 ms are assigned for transmission as data packets 230, 232, 234, and 236 with intervals 45 ms, 0 ms and 45 ms. The differences in intervals of 25 ms, 20 ms and 25 ms are the packet jitter introduced by the TDMA slot assignments. It should be noted also that packets, in being assigned to TDMA slots, must wait some time before transmission. In timing diagram 200, packet 224 must wait 30 ms after arrival before being transmitted. In other examples with a 45 ms TDMA frame, this could be as much as 45 ms for the case when a packet just misses the assigned slot in one frame and must wait an entire frame period before being transmitted in the next. In other examples, TDMA frames may be longer or shorter than 45 ms and TDMA slots can be assigned elsewhere in the TDMA frame than that shown in FIG. 2. The timing of the packets of packet stream 226 being according to assigned TDMA time slots means that the spacing in time of packets will be different from the regular 20 ms spacing of packet stream 202. The difference in packet spacing is known as packet jitter.

The jitter buffer 124 removes the packet jitter by outputting packets with the original 20 ms spacing. Jitter buffer 302 is thereby taking in packets which may be 45 ms apart, sometimes more than one packet at a time, but is releasing them one packet at a time every 20 ms. The jitter buffer, therefore, retains each packet for a period of time to achieve that regular interval (e.g., 25 ms in the depicted example), and must queue enough packets to ensure a packet will always be available for output. Both the wait time for transmit opportunities (e.g., up to 45 ms in the depicted example), and the buffer retention time necessary for jitter removal, however, result in the introduction of a considerable amount of packet latency in the link. Hence, as specified above, as a result, such added packet latency adversely affects the service quality experienced by quality of service (QoS) sensitive applications (e.g., voice applications, such as Voice over Internet Protocol (VOIP)). Further, since for the embodiment described above, the slot assignment and therefore the transmission packet spacing matches the packet stream packet spacing, this timing is maintained across the link and the packet stream can emerge from the receiver at its original 20 ms packet spacing. Without the large amounts of jitter possible in the conventional system to cater for, the packet latency is further reduced since the packets do not have to be retained for long periods in a jitter buffer.

According to an example embodiment of the present VFF approach, a "virtual" frame structure (within the base physical layer framing) is applied as a basis for assigning slots to input data packets. The TDMA timing generator 105 supplies the timing signals necessary to generate the 45 ms base physical layer TDMA frame and the slot boundaries within the TDMA frame. The TDMA frame timing derived from TDMA timing generator 105 remains as the physical layer frame basis for the network and is applied as a physical layer frame reference for system synchronization, and data encoding and modulation. The virtual frame is applied as a basis for slot assignment of data packets to a terminal for the transmission of data from a data stream (e.g., a VoIP data stream). The virtual framing, for example, is set at a periodicity proportional to the periodicity of the data stream. According to a further example embodiment, the periodicity of the virtual frame structure may be dynamically adjustable from one data session to the next to accommodate different data streams (source data applications) of the different data sessions.

Figure 4:
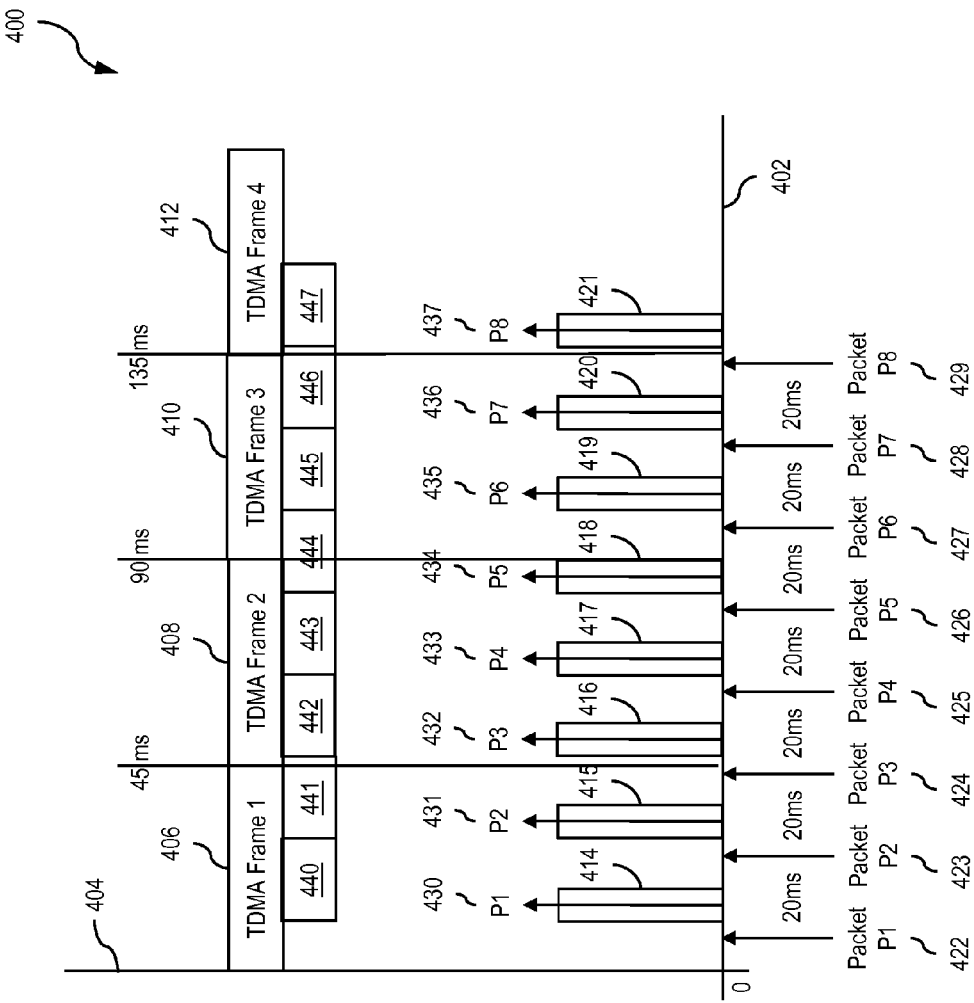
FIG. 4 illustrates a transmission timing diagram for transmission of a constant rate data packet stream, based on a VFF approach in accordance with example embodiments of the present invention.

FIG. 4 illustrates a transmission timing diagram 400 for transmission of a constant rate data packet stream (e.g., a VoIP data packet stream), based on a VFF approach in accordance with example embodiments of the present invention. With reference to FIG. 4, timing diagram 400 includes an X-axis 402 and a Y axis 404. The timing diagram 400 further depicts the TDMA frames 406, 408, 410 and 412, assigned TDMA slots of data bursts 414-421, input packets 422-429, and output packets 430-437. The X-axis 402 represents time and y-axis 404 represents timing events. In this example, physical layer TDMA frames 406, 408, 410 and 412 are arranged to be 45 ms in length.

According to the present embodiment, with reference to FIG. 4, data slots in each TDMA frame 406, 408, 410 and 412 have been assigned for the transmit data bursts 414-421 on a virtual frame basis. The virtual frame basis of FIG. 4 is configured to support the periodicity of the data stream of incoming data packets P1-P8. As reflected in the figure, the packets P1-P8 (422-429) are arriving at a constant 20 ms interval, and thus the slots of the data bursts 414-421 are assigned at a similar 20 ms interval. For example, the slot(s) of the data burst 414 are assigned for the packet P1, the slot(s) of the data burst 415 are assigned for the packet P2, the slot(s) of the data burst 416 are assigned for the packet P3, and so on. The data bursts 414-421 are thereby presented or assigned at a regular interval or periodicity to match the periodicity of the packets P1-P9 of the source data stream. In other words, a virtual frame structure (e.g., a 20 ms virtual frame in the present embodiment) is formed for the assignment of TDMA data slots for transmission of the data stream packets P1-P8, which is reflected in FIG. 4 as the virtual frames 440-447. The packets P1-P8 thereby form the packet stream 430-437 for transmission over the satellite channel 130.

As is further evident from the figure, multiple noncontiguous TDMA data slots are assigned within each TDMA frame as necessary to support the required data rate. For example, TDMA Frame 1 (406) will carry the data bursts 414 and 415 (containing the packets P1 and P2, respectively), TDMA Frame 2 (408) will carry the data bursts 416, 417 and 418 (containing the packets P3, P4 and P5, respectively), TDMA Frame 3 will carry the data bursts 419 and 420 (containing the packets P6 and P7, respectively), and TDMA Frame 4 will carry the data burst 421 (containing the packet P8). Accordingly, while the network continues to operate based on the 45 ms physical layer frame format (e.g., the data is encoded and modulated based on a 45 ms physical layer TDMA frame, and the system synchronizes based on that 45 ms TDMA frame structure), the slot(s) of the respective data bursts (e.g., 414-421) are assigned on a virtual frame basis to match the source data stream. Moreover, a data burst of assigned TDMA slots may even overlap a physical layer TDMA frame boundary, where part of the data burst is transmitted at the end of one physical layer TDMA frame and the remainder of the data burst is transmitted at the beginning of the subsequent physical layer TDMA frame.

Figure 5:
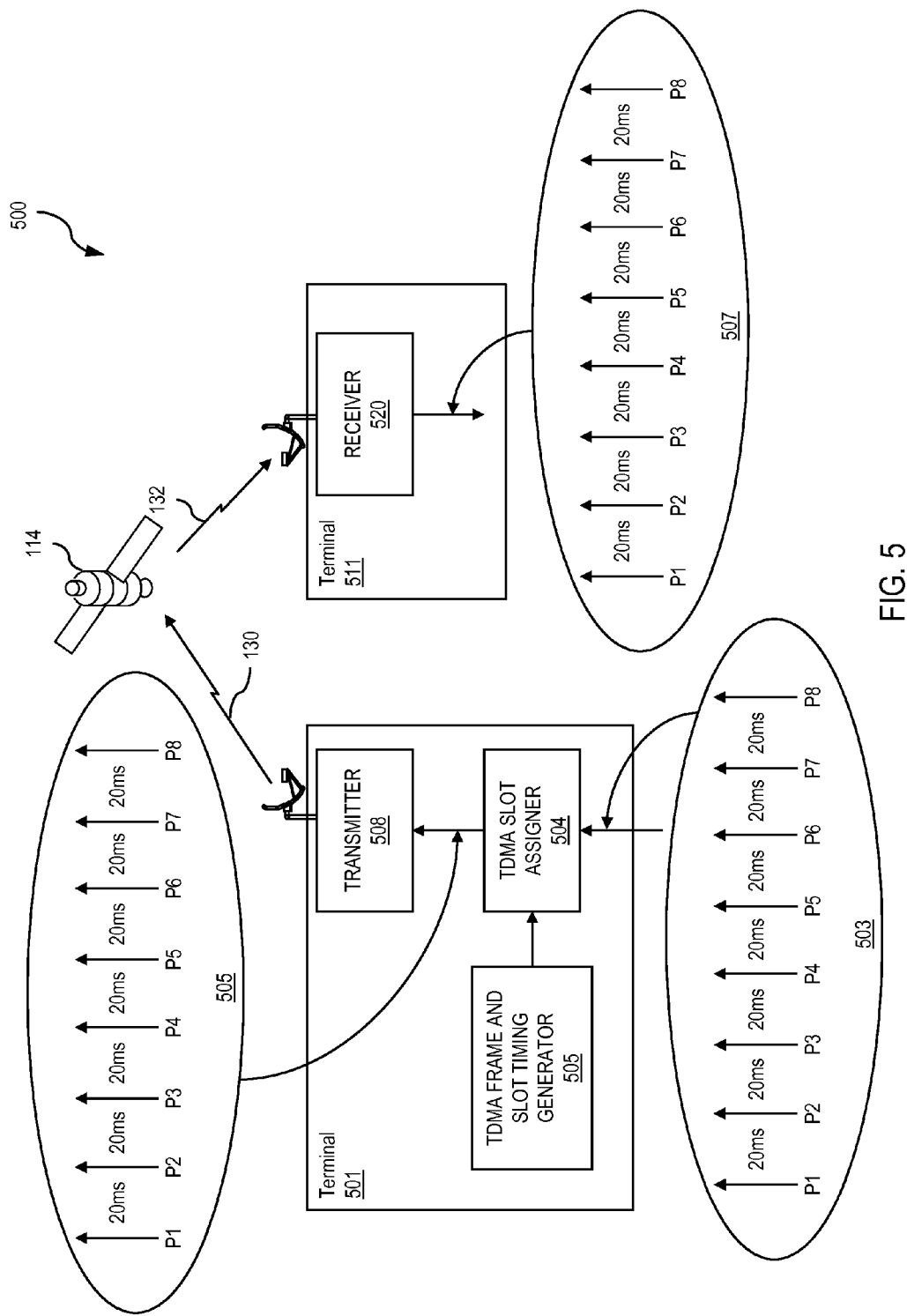
FIG. 5 illustrates a block diagram depicting an end-to-end transmission signal path for the data packet stream of FIG. 4 over the system of FIG. 1, based on a VFF approach in accordance with example embodiments of the present invention.

FIG. 5 illustrates a block diagram depicting an end-to-end transmission signal path for the data packet stream of FIG. 4 over the system of FIG. 1, based on a VFF approach in accordance with example embodiments of the present invention. With reference to FIG. 5, the terminal 501 includes the TDMA frame and slot timing generator 505, TDMA slot assignor 504 and transmitter 508. The TDMA frame and slot timing generator 505 provides TDMA frame and slot timing to TDMA slot assigner 504. The packets P1-P8 (422-429) are received at the 20 ms intervals (as reflected by 503). The packets are inserted in the assigned transmission slots of the data bursts 414-421 by the TDMA slot assignor (as reflected by 505). The resulting signal is encoded and modulated by the transmitter 508, and transmitted over the satellite 114 (via the satellite channels 130 and 132) to the receiver 520 of the terminal 511. The receiver 120 demodulates and decodes the received signal, to generate the data packet stream as reflected by 507. According to this embodiment, however, because the transmission TDMA data slots were assigned on a virtual frame basis supporting the periodicity of the received data stream, the received packets P1-P8 (as demodulated and decoded by the receiver 120) are received at the same periodicity of 20 ms (as received by the TDMA slot assignor 104). In accordance with the VFF approach of example embodiments of the present invention, therefore, a source data stream can be transmitted at a periodicity (based on a virtual frame structure) that matches the original periodicity of the source data stream and thereby eliminates or minimizes jitter that would otherwise be introduced based on a typical physical layer TDM frame structure in the transmission of the data over the communications network channel.

While the system of FIG. 5 and timing diagram 400 of FIG. 4 represent example embodiments wherein a single input packet data stream is transmitted over the satellite channels of the network, other embodiments in accordance with examples of the present invention may support a plurality of input packet streams with different periodicities. By way of example, one such embodiment may employ an approach whereby the greatest common divisor (GCD) of the periodicities of the multiple input packet streams is used as a basis for the virtual frame structure.

Figure 6:
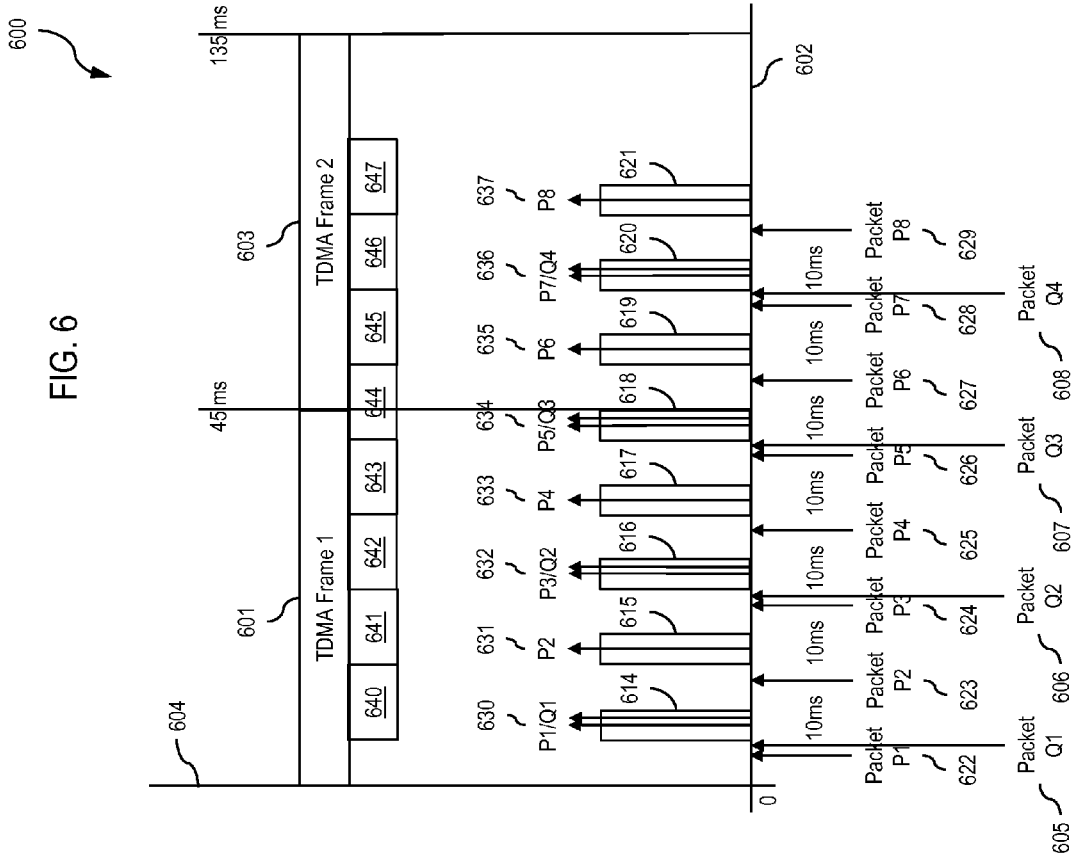
FIG. 6 illustrates a transmission timing diagram for transmission of two constant rate data packet streams (of differing data packet rates) over a single communications channel, based on a VFF approach in accordance with example embodiments of the present invention.

FIG. 6 illustrates a transmission timing diagram 600 for transmission of two constant rate data packet streams (of differing data packet rates) over a single communications channel, based on a VFF approach in accordance with example embodiments of the present invention. With reference to FIG. 6, timing diagram 600 contains the same basic elements of the timing diagram 200 of FIG. 2 and the timing diagram 400 of FIG. 4 including X-axis 602 and Y axis 604. FIG. 6 further depicts TDMA Frame 1 (601), TDMA Frame 2 (603), input packets P1-P8 (622-629) and input packets Q1-Q4 (605-608). The figure also depicts a virtual frame progression 640-647, and an output packet stream comprised of output packets 630-637 carried within data bursts 614-621. As for previous timing diagrams, the x-axis 602 represents time and y-axis 604 represents timing events, and the physical layer TDMA frames 601 and 603 are arranged to be 45 milliseconds in length. The frame boundaries of virtual the frames 640-647 are arranged to have a periodicity of 10 ms which is the GCD of the 10 ms packet stream comprised of input packets 622-629 and the 20 ms packet stream comprised of input packets 605-608.

As with the timing diagram 400 of FIG. 4, the TDMA data slots of the data bursts 614-621 are assigned and generated on the basis of the virtual frame periodicity (e.g., the periodicity of 10 ms in the present example), rather than the periodicity of the physical layer TDM frame structure (e.g., 45 ms in the present example). Similar to the timing diagram 400, the packets P1-P8 are respectively assigned to and carried within the slots of the data bursts 614-621. In addition, however, the data bursts 614, 616, 618 and 620 also respectively carry the packets Q1, Q2, Q3 and Q4). Accordingly, the packets P1-P8 of the P data stream will be transmitted and received at the periodicity of 10 ms (matching the periodicity of the source data stream P), and the packets Q1-Q4 of the Q data stream will be transmitted and received at the periodicity of 20 ms (matching the periodicity of the source data stream Q).

The GCD determines the longest possible VFF frame length that synchronizes with the packet generation frequencies. A longer VFF frame length results in more efficient bandwidth utilization. This VFF frame length can handle any number of packet generation frequencies and keep them all synchronized with the frame. According to the timing diagram 600, there may be two terminals each sharing the same channel. The first terminal may have an application that generates packets every 10 ms, and the second terminal may have an application that generates packets every 20 ms. Based on a VFF set for the greatest common factor of the two data streams (e.g., 10 ms in the present example), the VFF synchronizes with the packet generation frequency for both terminals. The system may determine the VFF frame length in real-time and can change the VFF frame length depending on the packet frequencies present on the channel. In accordance with the VFF approach of example embodiments of the present invention, therefore, multiple source data streams can be transmitted at a periodicity (based on a virtual frame structure) that matches the greatest common factor or the original periodicities of the source data streams, and thereby eliminates or minimizes jitter that would otherwise be introduced based on a typical physical layer TDM frame structure in the transmission of the data over the communications network channel.

In this and other embodiments, the periodicity of each packet stream may be determined by a variety of methods including, but not limited to, the use of a SIP (Session Initiation Protocol) proxy communicating with the appropriate device such as a voice codec, in order to for the VFF process to match the stream packet spacing with a virtual frame size.

According to further example embodiments, approaches are provided whereby a plurality of packet streams of different periodicities can be accommodated over different channel frequencies of a multi-frequency TDMA (MF-TDMA) system. According to such embodiments, an MF-TDMA system may set different channel frequencies to different virtual frame periodicities. The VFF process would assign input packet streams to different channels according to the packet spacing of the stream. This method can be combined with the GCD method described above to accommodate a diverse range of packet stream periodicities.

Figure 7:
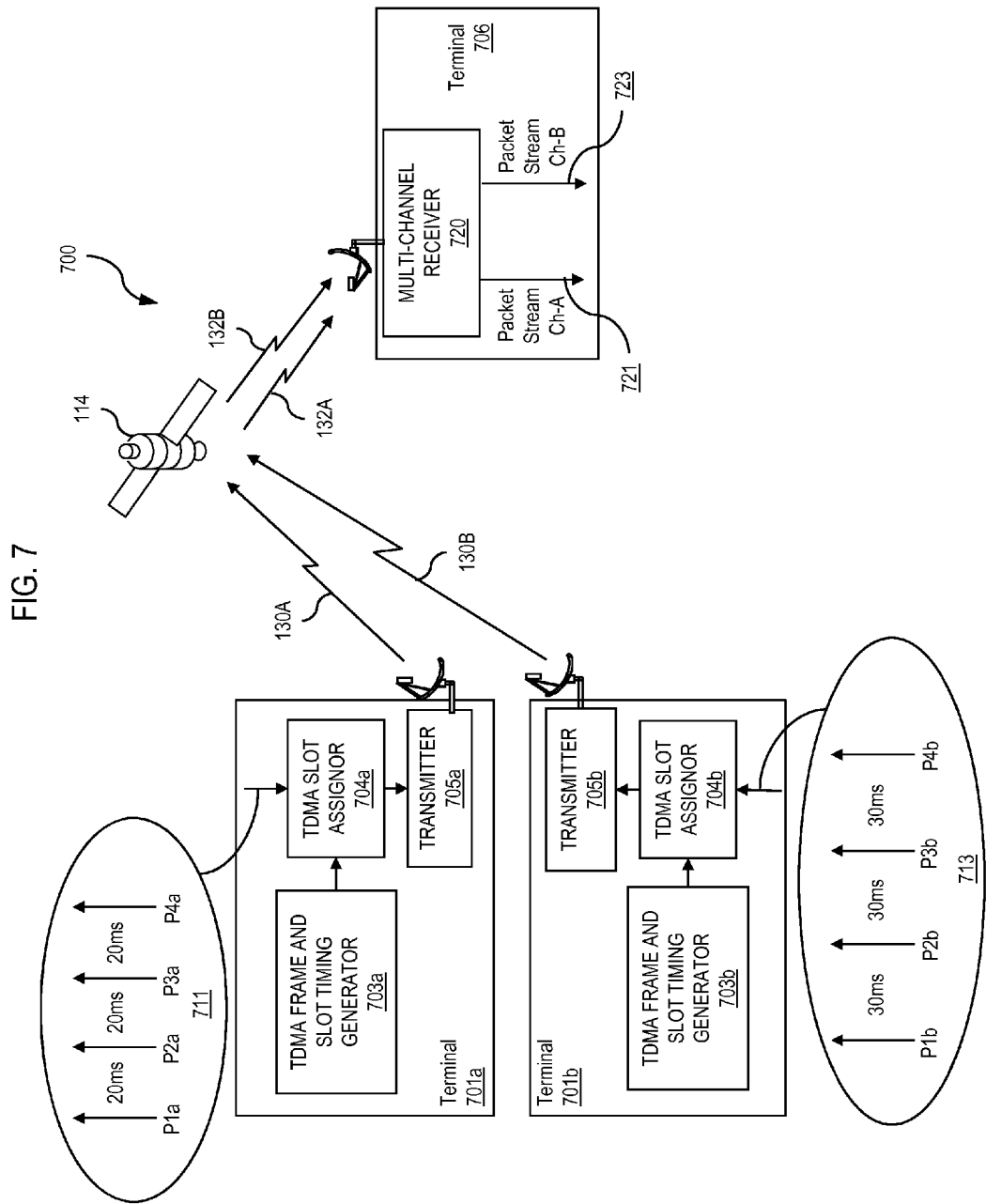
FIG. 7 illustrates a block diagram depicting end-to-end transmission signal paths for transmission of two constant rate data packet streams (of differing data packet rates) over multiple communications channels in a multi-channel TDMA satellite system, based on a VFF approach in accordance with example embodiments of the present invention.

FIG. 7 illustrates a block diagram depicting end-to-end transmission signal paths for transmission of two constant rate data packet streams (of differing data packet rates) over multiple communications channels in a multi-frequency TDMA satellite system, based on a VFF approach in accordance with example embodiments of the present invention. With reference to FIG. 7, the system 700 comprises a satellite terminal 701*a*, which includes a TDMA frame and slot timing generator 703*a*, a TDMA slot assignor 704*a* and a transmitter 705*a*, and a satellite terminal 701*b*, which includes a TDMA frame and slot timing generator 703*b*, a TDMA slot assignor 704*b* and a transmitter 705*b*. The system further comprises the satellite 114 and a terminal 706, which includes a multi-channel receiver 720. The terminals 701*a* and 701*b* may each be capable of transmitting on either channel A (130A) or channel B (130B), but for the present embodiment, it will be assumed that the terminal 701*a* will be transmitting on Channel A (130A) and the terminal 701*b* will be transmitting on Channel B (130B). Further, the multi-channel receiver 720 of the terminal 706 may be configured to receive both the Channel A transmissions from terminal 701*a* over the satellite downlink transmission channel 132A and the Channel B transmissions from terminal 701*b* over the satellite downlink transmission channel 132B. The multi-channel receiver 720 receives the downlink transmission signals from the satellite 114, comprising both the channel A and channel B transmissions 132A and 1332B, and performs frequency conversion, demodulation, decoding and demultiplexing functions to produce the individual data packet streams 721 and 723, respectively reflecting the source packet data streams 711 and 713.

Each of the terminals 701*a* and 701*b* operate similarly to the transmitting terminal 501 of the system 500 (in FIG. 5). By way of example, the packets of the source packet stream 711 (originating at an input port of terminal 701*a*) are at a packet data rate with 20 ms interval spacing, and the packets of the source packet stream 713 (originating at an input port of terminal 701*b*) are at a packet data rate with 30 ms interval spacing. Accordingly, the In accordance with aspects of the present invention in this embodiment, virtual frame timing source 404 is sourcing a 20 ms virtual frame in order to support input packet stream 202 and this virtual frame is used on channel A. Similarly, virtual frame timing source 706 is sourcing a 30 ms virtual frame in order to support input packet stream 705 and that virtual frame is used on channel B. So, TDMA slot assigner 402 is assigning packets to slots on the basis of a 20 ms virtual frame and transmitter 212 is putting out TDMA bursts 20 ms apart on channel A, while simultaneously TDMA slot assigner 714 is assigning packets to slots on the basis of a 30 ms frame and transmitter 716 is putting out TDMA bursts which are 30 ms apart on channel B. Therefore, both the 20 ms periodicity of input packet stream 202 and the 30 ms periodicity of input packet stream 705 are therefore maintained across the communications link to appear at output packet stream 726 and output packet stream 728 respectively. This figure illustrates that for a MF-TDMA system, aspects of the present invention can support a plurality of terminals with differing input packet stream periodicities by using a plurality of virtual frames allocated to use particular channel frequencies.

In another MF-TDMA embodiment in accordance with aspects of the present invention, the unique aspects of system 600 and system 700 are combined. That is, both GCD based virtual framing and channel frequency based virtual framing are used together. In this embodiment a plurality of terminals each supporting a plurality of packet streams of differing periodicity can be supported by multiple virtual frames on multiple channel frequencies.

A problem with conventional TDMA and MF-TDMA systems is that the process of assigning time slots to packet traffic, or time and frequency slots in the case of MF-TDMA, can generate undesirable levels of packet jitter if there are large differences between the TDMA frame length and the periodicity of the packet stream for transmission. Furthermore, conventional methods used to queue packets for transmission and to buffer packets for jitter reduction at the receiver can also introduce undesirable levels of packet latency across the link. This is especially true for voice applications such as VOIP and for satellite networks which have already have large packet latencies due to satellite delays. The foregoing descriptions illustrate and explain how systems and methods in accordance with aspects of the present invention can overcome this problem by employing a unique mechanism hereto referred to as Virtual Flexible Framing or VFF. VFF generates virtual frames that coexist along with or within the conventional TDMA framing and the virtual frames are used instead of the conventional TDMA frame timing for slot and frequency assignment. It has been described how when virtual frames are synchronized with the arriving packet streams, the waiting times for packets to be transmitted and therefore latency is significantly reduced and the jitter caused by conventional TDMA slot assignment is eliminated. It has been shown that without such jitter, long waits in conventional jitter buffers are also eliminated and packet latency is further reduced.

Further, embodiments in accordance with aspects of the present invention can accommodate pluralities of terminals and pluralities of packet streams through various methods including the use of greater common denominators in choosing virtual frame lengths and by allotments of virtual frames to channels in MF-TDMA systems.

The VFF approaches in accordance with example embodiments of the present invention is not limited to a fixed virtual frame size, but rather provides for flexibility and adaptation for differing application scenarios. By way of example, different virtual frame sizes may be configured based on traffic quality of service requirements. By way of further example, virtual frame sizes may be adapted (e.g., in the case of a voice data stream) using a SIP proxy to determine the voice frame interval used for the negotiated codec and then matching a derived virtual frame size with the codec rate. By way of yet a further example, the system may be configured to automatically train to a virtual frame size based on a traffic input rate of an application, such as for Internet based conferencing applications (e.g., Skype), wherein the system would be configured to determine a packet input rate based on a predetermined number of initial data packets and to set the VFF size based on the determined (trained) packet input rate.

FIG. 8 illustrates a block diagram of a chip set that can be utilized in implementing VFF approaches, in accordance with example embodiments of the present invention. With reference to FIG. 8, chip set 800 includes, for instance, processor and memory components, such as described with respect to FIGS. 4 and 7, incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set. A processor 803 has connectivity to the bus 801 to execute instructions and process information stored in, for example, a memory 805. The processor 803 includes one or more processing cores with each core configured to perform independently. A multi-core processor enables multiprocessing within a single physical package. Examples of a multi-core processor include two, four, eight, or greater numbers of processing cores. Alternatively or in addition, the processor 503 includes one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, and/or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 may comprise various forms of computer-readable media, e.g., including both dynamic memory (e.g., RAM) and static memory (e.g., ROM) for storing executable instructions that, when executed by the processor 803 and/or the DSP 807 and/or the ASIC 809, perform the process of example embodiments as described herein. The memory 805 also stores the data associated with or generated by the execution of the process.

The term "computer-readable medium" or "computer-readable media," as used herein, refers to any medium that participates in providing instructions for execution by the processor 803, and/or one or more of the specialized components, such as the one or more digital signal processors (DSP) 807, and/or one or more application-specific integrated circuits (ASIC) 809. Such a medium may take many forms, including but not limited to non-volatile media, volatile media, and transmission media. Non-volatile media include, for example, read only memory (ROM), included within memory 805. Volatile media, for example, may include dynamic random access memory (RAM), included within memory 805. Transmission media may include copper or other conductive wiring, fiber optics, or other physical transmission media, including the wires and/or optical fiber that comprise bus 801. Transmission media can also take the form of wireless data signals, such as those generated during radio frequency (RF) and infrared (IR) data communications. Common forms of computer-readable media include, for example, magnetic storage media (e.g., magnetic hard disks or any other magnetic storage medium), solid state or semiconductor storage media (e.g., RAM, PROM, EPROM, FLASH EPROM, a data storage device that uses integrated circuit assemblies as memory to store data persistently, or any other storage memory chip or module), optical storage media (e.g., CD ROM, CDRW, DVD, or any other optical storage medium), a or any other medium for storing data from which a computer or processor can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a remote terminal device, a first source data stream for transmission over a transmission channel of a communications network, wherein the first source data stream comprises a series of data packets received by the remote terminal device at periodic time intervals;
    receiving an allocation of bandwidth for the data packets of the first source data stream, wherein the bandwidth allocation comprises a plurality of time slots of a sequence of time division multiple access (TDMA) transmission frames, wherein a timing structure of the allocated time slots is based on a virtual frame size relative to the periodic interval timing of the data packets of the first source data stream, and wherein the virtual frame size is independent of a timing structure or frame size of the TDMA transmission frames; and
    assigning each data packet of the first source data stream to a respective allocated time slot for transmission over the transmission channel.

2. The method of claim 1, wherein the data packets of the first source data stream are received by the remote terminal device at a constant rate.

3. The method of claim 1, wherein the virtual frame size is configured to correspond with the periodic time intervals at which the data packets of the first source data stream are received by the remote terminal device.

4. The method of claim 1, wherein the virtual frame size is configured based on a quality of service requirement associated with the first source data stream.

5. The method of claim 1, wherein the virtual frame size is configured based on a voice codec rate associated with the first source data stream.

6. The method of claim 5, wherein the virtual frame size is configured based on a voice frame interval of the voice codec determined using a session initiation protocol proxy.

7. The method of claim 1, wherein the virtual frame size is configured based on a packet timing interval determined during an initial training period of the receipt of the data packets of the first source data stream.

8. The method of claim 1, further comprising:
    receiving, by the remote terminal device, a second source data stream for transmission over the transmission channel of the communications network, wherein the second source data stream comprises a series of data packets received by the remote terminal device at periodic time intervals, wherein the periodic time intervals of the data packets of the second source data stream differ from the periodic time intervals of the data packets of the first source data stream;
    wherein the timing structure of the allocated time slots is based on a virtual frame size relative to a greatest common denominator of the periodic interval timing of the data packets of the first source data stream and the periodic interval timing of the data packets of the second source data stream; and
    wherein the data packets of the first source data stream and the second source data stream is each assigned to a respective allocated time slot for transmission over the transmission channel.

9. The method of claim 8, wherein the data packets of the first source data stream are received by the remote terminal device at a first constant rate and the data packets of the second source data stream are received by the remote terminal device at a second constant rate that differs from the first constant rate.

10. The method of claim 9, wherein the virtual frame size is configured to correspond with the greatest common denominator, and wherein the greatest common denominator is with respect to the first constant rate and the second constant rate.

11. An apparatus comprising:
    a first port configured to receive a first source data stream for transmission over a transmission channel of a communications network, wherein the first source data stream comprises a series of data packets received by the apparatus at periodic time intervals; and
    a processor configured to receive an allocation of bandwidth for the data packets of the first source data stream, wherein the bandwidth allocation comprises a plurality of time slots of a sequence of time division multiple access (TDMA) transmission frames, wherein a timing structure of the allocated time slots is based on a virtual frame size relative to the periodic interval timing of the data packets of the first source data stream, and wherein the virtual frame size is independent of a timing structure or frame size of the TDMA transmission frames;
    wherein the processor is further configured to assign each data packet of the first source data stream to a respective allocated time slot for transmission over the transmission channel.

12. The apparatus of claim 11, wherein the data packets of the first source data stream are received by the apparatus at a constant rate.

13. The apparatus of claim 11, wherein the virtual frame size is configured to correspond with the periodic time intervals at which the data packets of the first source data stream are received by the apparatus.

14. The apparatus of claim 11, wherein the virtual frame size is configured based on a quality of service requirement associated with the first source data stream.

15. The apparatus of claim 11, wherein the virtual frame size is configured based on a voice codec rate associated with the first source data stream.

16. The apparatus of claim 15, wherein the virtual frame size is configured based on a voice frame interval of the voice codec determined using a session initiation protocol proxy.

17. The apparatus of claim 11, wherein the virtual frame size is configured based on a packet timing interval determined during an initial training period of the receipt of the data packets of the first source data stream.

18. The apparatus of claim 11, further comprising:
a second port configured to receive a second source data stream for transmission over the transmission channel of the communications network, wherein the second source data stream comprises a series of data packets received by the apparatus at periodic time intervals, wherein the periodic time intervals of the data packets of the second source data stream differ from the periodic time intervals of the data packets of the first source data stream;
wherein the timing structure of the allocated time slots is based on a virtual frame size relative to a greatest common denominator of the periodic interval timing of the data packets of the first source data stream and the periodic interval timing of the data packets of the second source data stream; and
wherein the data packets of the first source data stream and the second source data stream is each assigned to a respective allocated time slot for transmission over the transmission channel.

19. The apparatus of claim 18, wherein the data packets of the first source data stream are received by the apparatus at a first constant rate and the data packets of the second source data stream are received by the apparatus at a second constant rate that differs from the first constant rate.

20. The apparatus of claim 19, wherein the virtual frame size is configured to correspond with the greatest common denominator, and wherein the greatest common denominator is with respect to the first constant rate and the second constant rate.

\* \* \* \* \*